July 18, 1961 M. B. GOREN 2,992,892
PROCESS FOR PRECIPITATING A VANADIUM OXIDE PRODUCT
Filed May 31, 1957
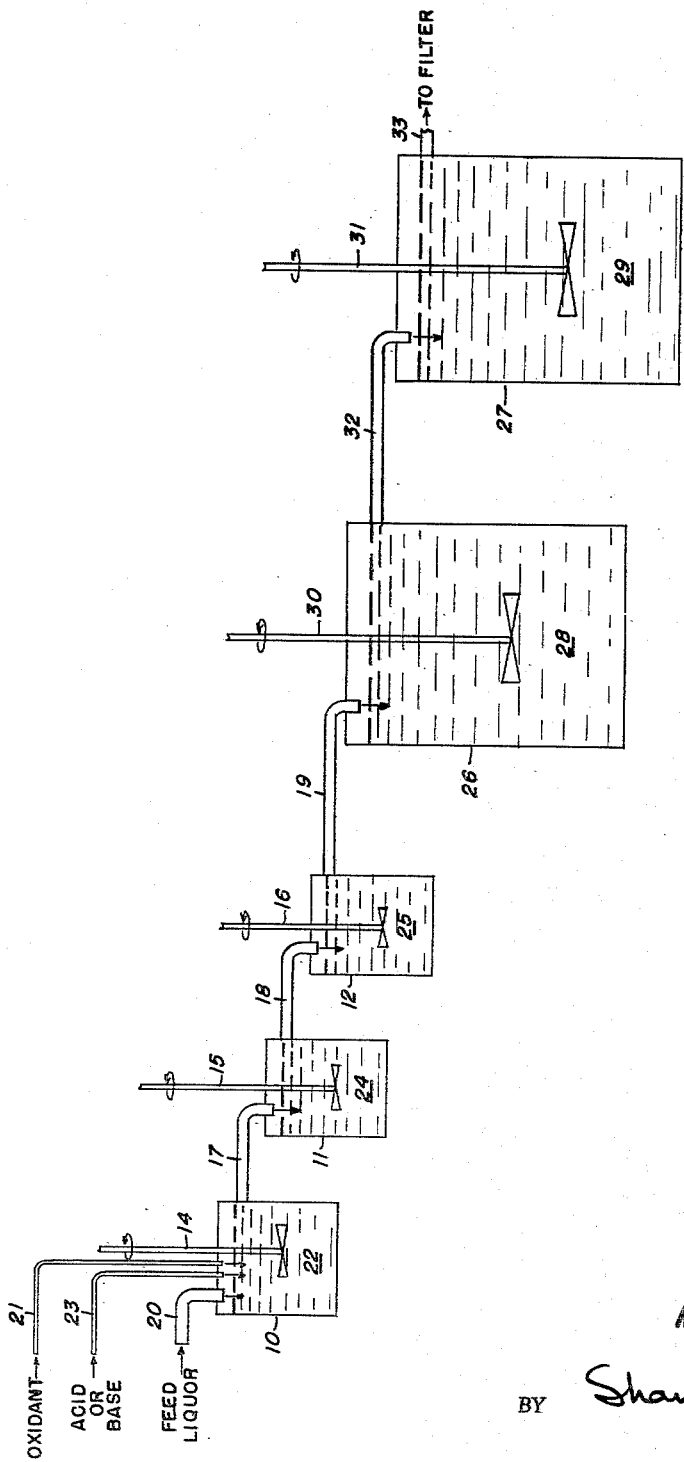
INVENTOR
MAYER B. GOREN
BY Shanley & O'Neil
ATTORNEY United States Patent Office 2,992,892
Patented July 18, 1961

2,992,892
PROCESS FOR PRECIPITATING A VANADIUM OXIDE PRODUCT
Mayer B. Goren, Denver, Colo., assignor to Kerr-McGee Oil Industries, Inc., a corporation of Delaware
Filed May 31, 1957, Ser. No. 662,619
12 Claims. (Cl. 23—140)

The present invention relates to the recovery of vanadium from its solutions and more particularly to a continuous process for the precipitation of a commercially acceptable vanadium oxide product from liquors containing vanadium.

Several processes are known for the batch precipitation of a commercially acceptable vanadium containing product from vanadium containing liquors. For example, one such process comprises precipitating the vanadium content of an alkaline vanadium bearing liquor containing from 30 to 60 grams $V_2O_5$/l. and about 40–100 g./l. sodium salts (primarily NaCl or $Na_2SO_4$) as red cake ($Na_2H_2V_6O_{17}$) by adjusting the pH of the liquor to 3–3.5 and heating the solution to boiling, readjusting the pH to about 3, and then allowing the vanadium content of the solution to precipitate over a period of about one to two hours with adequate stirring. The precipitate of red cake is filtered from the barren liquor, washed with ammonium sulfate to prepare largely the ammonium form, and then the resulting product is dried and fired to produce a product having a vanadium content of about 86–90% $V_2O_5$.

The above mentioned batch precipitation process will produce a commercially satisfactory vanadium oxide product provided the $V_2O_5$ to $P_2O_5$ ratio is sufficiently high in the original vanadium pregnant liquor. For example, generally the $V_2O_5$ to $P_2O_5$ ratio must be at least as high as 100 to 1 in order to produce a specification grade product. However, it will be appreciated that even when the $V_2O_5$ to $P_2O_5$ ratio is favorable the foregoing process, as well as all similar processes known in the art prior to the present invention, are batch precipitation processes and have all the inherent economic disadvantages of a batch process. As a result, the art has long sought a satisfactory process for the precipitation of vanadium from vanadium bearing liquors by a continuous process which will produce a vanadium oxide product meeting commercial specifications. Attempts heretofore to continuously precipitate vanadium from vanadium containing liquors resulted in a vanadium oxide product which would not meet the rigid commercial specifications, and thus the product so prepared was useless from a commercial standpoint without further purification by an involved and expensive treatment.

It has been discovered that a vanadium oxide product meeting commercial specifications may be precipitated by the continuous process of the present invention. A vanadium oxide product produced in accordance with the present invention consistently meets all specifications for a commercially acceptable product and, in addition, the process of the present invention has all the inherent economic advantages of a continuous process.

Two classes of high grade vanadium pregnant liquors suitable as feed liquors for the precipitation process herein disclosed are:

(1) Acid liquors (pH about 2.0 and lower, in general) containing reduced vanadium (generally quadrivalent vanadium), and (2) Nearly neutral to alkaline liquors (pH about 5 and higher) containing vanadium in the quinquevalent state, generally as vanadate.

The acid liquors containing reduced vanadium are derivable by a variety of processes. For example, the elution of $V_2O_5$-loaded anion exchange resins with an aqueous sulfurous acid solution affords an acidic, reduced vanadium pregnant solution. Alternately, vanadium may be solvent extracted from dilute acid leach liquors by contacting the same with certain phosphoric acid esters in organic diluents such as kerosene. The loaded organic phase is then stripped of its vanadium content by contacting the organic phase with somewhat more concentrated aqueous acid. In this step, the quadrivalent vanadium is transferred to the acid stripping solution to afford relatively concentrated vanadium pregnant solutions of relatively high acidity and in which the vanadium is present largely in the quadrivalent state. Vanadium pregnant liquors of the second classification (e.g. quinquevalent vanadium in solutions having a pH of about 5 or higher) are derivable by the familiar salt roast-water leaching of vanadium ores; by carbonate leaching of vanadium ores (either roasted or uncalcined), or by alkaline or soda ash leaching of crude vanadium concentrates containing at least a part of the vanadium in the oxidized form (plus 5). When these liquors, either acid or alkaline, proceed to precipitation for the preparation of high grade vanadium products by either conventional means or by the process herein described, they are rich in contained vanadium as compared with other constituents which they might contain as impurities. Among these are phosphate as an anion impurity; and iron, aluminum and similar multivalent cations, all of which are in general present only as minor constituents. For the purpose of the practice of this invention, both of the above mentioned types of liquors can be processed.

In this particular art, the vanadium and phosphorus contents of vanadium pregnant liquors or vanadium containing products are commonly calculated as grams per liter or percent by weight $V_2O_5$ and $P_2O_5$, respectively. However, it is understood that such liquors or products do not necessarily contain their vanadium and phosphorus content as $V_2O_5$ and $P_2O_5$, as the foregoing terms are used merely for convenience in this art as well as in the present specification and claims. Using such terminology, the commercial specifications (by weight) for a commercially acceptable vanadium oxide product are a $V_2O_5$ content of at least 86%, a $P_2O_5$ content of not more than 0.115%, and a $SO_4^{--}$ content of not more than 0.45%. These specifications are very rigid and if a given vanadium oxide product does not meet each and every specification above mentioned, then the vanadium oxide product is not commercially acceptable and is useless from the commercial standpoint unless further purified by involved and costly procedures. Thus, it will be appreciated that small differences in the $V_2O_5$, $P_2O_5$ and $SO_4^{--}$ content of a vanadium oxide product are of great importance in this art.

It is an object of the present invention to provide an improved process for the recovery of vanadium from vanadium bearing liquors.

It is a further object of the present invention to provide a continuous process for the precipitation of vanadium from vanadium bearing liquors.

It is still a further object of the present invention to provide a continuous process for the precipitation and preparation of a vanadium oxide product meeting commercial specifications from vanadium bearing liquors.

Still other objects of the present invention and the advantages thereof will be apparent to those skilled in the art from the following detailed description of the present invention, the specific examples, and the drawing which diagrammatically illustrates one suitable arrangement of apparatus for practicing the present invention.

In accordance with the present invention, at least a portion of the vanadium content of a hot vanadium containing liquor having substantially all of its vanadium content in the plus 5 oxidation state and a pH not greater than 1.7 is precipitated while continuously passing the liquor, successively, through a series of at least three primary reactors, with the residence time of the liquor in each of the primary reactors being between thirty seconds and three minutes and the total residence time of the liquor in the primary reactors being at least six minutes. Thereafter, the liquor may be passed through at least one secondary reactor with the residence time in the secondary reactor or reactors being sufficient to achieve the desired degree of depletion of vanadium from the liquor. While the liquor is within the primary and secondary reactors, it is necessary that conditions of pH, temperature, and the oxidation state of the vanadium be controlled in accordance with the practices disclosed herein.

Referring now to the drawing, there is illustrated one suitable arrangement of apparatus for practicing the process of the present invention. The primary reactors 10, 11 and 12 are of similar construction and have substantially the same capacity. Each of the primary reactors 10, 11 and 12 are provided with agitation means 14, 15 and 16 and overflow conduits 17, 18 and 19, respectively. The overflow conduits 17, 18 and 19 are located in upper portions of the reactors with each overflow conduit being so arranged as to provide for transfer of overflow liquor to the next succeeding reactor. The reactors in the series are of a progressively lower elevation to thereby allow the transfer of liquor to take place by gravity. This arrangement is for convenience only and it will be obvious to those skilled in the art that other suitable apparatus or arrangements of apparatus will effectively meet the essential conditions of the process of the invention.

A vanadium pregnant liquor, such as previously described, is continuously fed to primary reactor 10 via conduit 20 at a predetermined rate of feed, the feed rate being so adjusted as to provide a thirty second to three minute residence time of the feed liquor therein. The feed liquor in primary reactor 10 may be oxidized, if necessary, by the continuous addition of a slight excess of oxidant via conduit 21, the amount of oxidant added being sufficient to oxidize and maintain the vanadium content of the feed liquor in the plus 5 oxidation state. In addition, the pH of the feed liquor is adjusted to a pH not in excess of about 1.7 by the addition of acid or alkali as needed either enroute to, or within primary reactor 10, such as by means of conduit 23, as shown. The contents 22 of primary reactor 10 are vigorously agitated by agitation means 14 and maintained at an elevated temperature preferably approximating the boiling point of the liquor by conventional heating means such as a steam sparge (not shown).

The contents 22 of the first primary reactor 10 containing liquor and some precipitated product are continuously transferred via conduit 17 to second primary reactor 11 where the liquor and precipitated product are also maintained at an elevated temperature preferably approximating the boiling point of the liquor by conventional heating means (not shown). The second primary reactor 11 is provided with suitable agitation means 15. The contents 24 of the second primary reactor 11 containing liquor and a somewhat larger amount of precipitated product than present in primary reactor 10 is, in turn, continuously transferred via conduit 18 to third primary reactor 12. The third primary reactor 12 is identical with the preceding primary reactors 10 and 11 and likewise provided with heating means (not shown) for maintaining the contents 25 at an elevated temperature, preferably at a temperature approximating the boiling point of the liquor. Agitation means 16 are also provided for agitating the contents 25. The contents 25 of reactor 12 containing liquor and a somewhat larger amount of precipitate than was present in the primary reactor 11 is transferred via conduit 19 to the first secondary reactor 26.

It may be noted at this point that since the primary reactors 10, 11 and 12 are so constructed as to have substantially the same capacity, if the feed rate to primary reactor 10 is so adjusted as to provide a residence time of the liquor within the primary reactor 10 of thirty seconds to three minutes, then the residence time of the liquor within the succeeding primary reactors 11 and 12 will also closely approximate the residence time within primary reactor 10, i.e., be about thirty seconds to three minutes. This is true since the conduits 17, 18 and 19 are so constructed as to be capable of continuously transferring the amount of liquor entering primary reactor 10 to reactors 11, 12 and 26 at the selected feed rate. While the foregoing arrangement will conveniently provide for a suitable residence time within each of the primary reactors, it is understood that other means may also be provided which will insure a proper residence time, such as control valves, pumps, etc. It is only essential that the residence time within the primary reactors be maintained within the limits of thirty seconds to three minutes and the manner in which this is accomplished does not comprise a part of this invention.

The secondary reactors 26 and 27 are of similar construction, with each being provided with conventional heating means (not shown) such as a steam sparge for maintaining the contents 28 and 29, respectively, at an elevated temperature and preferably approximating the boiling point of the liquor. Agitation means 30 and 31 are provided in secondary reactors 26 and 27, respectively, for the purpose of agitating the contents. The capacities of secondary reactors 26 and 27 are sufficiently great to provide a total residence time therein sufficient to allow for digesting the precipitate formed in the primary reactors 10, 11 and 12, and also provide sufficient time for depletion of the vanadium content of the original feed liquor to a desired level. Preferably, the capacities of secondary reactors 26 and 27 are sufficient to allow a residence time of about thirty minutes in each of the reactors, with the total residence time in the secondary reactors being about one hour. However, the residence time of the liquor in the secondary reactors 26 and 27 is not critical.

As mentioned above, the contents 25 of primary reactor 12 are transferred via conduit 19 to secondary reactor 26 and, similarly, the contents 28 of secondary reactor 26, containing liquor and considerable amounts of precipitated product are transferred via conduit 32 to secondary reactor 27. The vanadium content of the liquor is depleted during its residence time in secondary reactor 27, and a slurry of precipitated product and barren liquor overflows from secondary reactor 27 via conduit 33. The slurry is passed to a filter where the precipitated product is recovered, then washed, and dried at a suitable temperature, such as 115° C. The product contains above 90% $V_2O_5$ and quantities of $P_2O_5$ and $SO_4^{--}$ well below the maximum permissible percentages allowed in commercial specifications, i.e., below 0.115% and 0.45%, respectively. If desired, this product may be fired to obtain a vanadium oxide product having a $V_2O_5$ content approaching 99%, and likewise containing objectionable impurities substantially below the maximum allowable percentages.

The vanadium content of the feed liquor to primary reactor 10 should contain at least 10 grams of $V_2O_5$ per liter, and preferably 20 to 60 grams of $V_2O_5$ per liter. In addition, the ratio of $V_2O_5$ to $P_2O_5$ in the feed liquor to primary reactor 10 is of importance since, in some instances, a specification grade product may not be obtained if the $V_2O_5$ to $P_2O_5$ ratio is below 30:1, because of excessive amounts of $P_2O_5$ in the product. Preferably, the $V_2O_5$ to $P_2O_5$ ratio should be above 100:1. There is no upper limit on the $V_2O_5$ to $P_2O_5$ ratio as any suitable ratio above 30:1 is satisfactory, but better results are obtained with higher ratios of $V_2O_5$ to $P_2O_5$.

The pH of the feed liquor to the first primary reactor 10 may vary over a wide range as a consequence of the origin of the liquors; however, within the primary and secondary reactors, the pH as measured at ambient temperature, should be controlled and maintained at a value not greater than about 1.7, and sufficiently low as to precipitate a specification grade product. It has been found that the amount of phosphate which is carried down with the vanadium oxide precipitate is a function of the degree of contamination of the feed liquor with this anion, but satsfactory phosphate rejection is achieved when the continuous precipitation is carried out according to the process of this invention. For relatively low phosphate liquors ($V_2O_5$ to $P_2O_5$ ratios of about 100 or higher), the most satisfactory results will be achieved if the pH is maintained at a value not greater than 1.5 and preferably between about 0.5 and 1.5; for $V_2O_5$ to $P_2O_5$ ratios between about 30:1 and 100:1, the most satisfactory results are achieved if the pH within the reactors is maintained at a value not greater than 1 and preferably 0.5–1.0.

In the processing of acidic reduced liquors, an understanding of the pH changes attendant upon the oxidation-hydrolytic precipitation allows considerable adjustment of the pH of the feed liquors prior to their entry into the reactors, the acid produced during oxidation-precipitation effecting the final pH adjustment to the desired levels. However, additional adjustments in pH may be made within the reactors proper by addition of acid or base as needed.

If the vanadium pregnant liquor fed to the first primary reactor 10 has at least a portion of its vanadium content in an oxidation state lower than plus 5, it is necessary when operating with such liquors to oxidize and then maintain substantially all of the vanadium content in the plus 5 oxidation state while within the primary and secondary reactors. This may be conveniently accomplished, as illustrated in the drawing, by continuously feeding a slight excess of oxidant to the first primary reactor 10. The amount of oxidant added to primary reactor 10 is a quantity sufficient to oxidize and maintain the vanadium content thereof in the plus 5 oxidation state. A quantity of oxidant sufficient to maintain the E.M.F. in the close proximity of −700 mv. (platinum vs. saturated calomel) has been found to be satisfactory. As is well understood in the art, "E.M.F." refers to electromotive force and the "mv." refers to millivolts. Examples of suitable oxidants for use in practicing the present invention have been found to be sodium peroxide, sodium chlorate, etc. While it is not generally necessary, suitable amounts of oxidant may be added to one or more reactors other than primary reactor 10 for the purpose of maintaining the vanadium content of the liquor in the plus 5 oxidation state. In the processing of alkaline relatively oxidized liquors, most of the pH adjustment (usually with sulfuric acid) can be made either on the flowing stream or in surge tanks just ahead of the first primary reactor with final pH adjustments, if necessary, being made within the reactors proper. Slight adjustments in the oxidation potential of these liquors may occasionally be necessary and these are most readily accomplished by addition of requisite amounts of oxidant to the primary reactors, as needed.

In the practice of this invention, it is necessary that the pregnant liquor contents be brought to the precipitating conditions for the first time within the primary reactors and preferably within the first of the primary reactors. These conditions are high temperature, e.g., a temperature of at least about 80° C. and preferably near the boiling point; high oxidation state (plus 5 for essentially all of the vanadium content); and a pH level as hereinabove defined. Conditioning surge tanks ahead of the primary reactors may be used for pH adjustment, oxidation, or heating as desired, but the three conditions above defined should not be attained until the pregnant liquor reaches or is about to reach the first primary reactor.

The illustrative example of suitable apparatus for use in practicing the present invention has been specifically described herein as comprising a series of at least three individual primary reactors. However, it will be apparent to those skilled in the art that a pipe filled with portions of flowing pregnant liquor wherein the liquor on the downstream side cannot mix with the liquor on the upstream side is an equivalent to the series of three or more primary reactors, and is within the scope of this invention. It will be further apparent to those skilled in the art that if the pipe contents are brought to the conditions of precipitation as hereinabove described, that satisfactory continuous precipitation of the vanadium content of these pregnant liquors will result.

The contents of both the primary and secondary reactors are maintained at an elevated temperature by conventional heating means such as by a steam sparge and, for best results, the temperature of the various reactor contents is maintained at or near the boiling point of the liquor. When the contents of the primary reactor 10 are maintained at the boiling point, a slight excess of oxidant is present, and the pH of the contents is maintained within the range hereinbefore disclosed, then rapid precipitation of vanadium product from the entering pregnant liquor results. The precipitate continues to form very rapidly within the succeeding primary reactors 11 and 12 and the vanadium content of the original pregnant liquor is reduced considerably before the liquor passes to the secondary reactors 26 and 27.

It is essential that at least three primary reactors be used in practicing the present invention, but any number of primary reactors above three may be used. In addition, it is essential that the residence time of the liquor within each primary reactor be maintained within the limits of about thirty seconds to about three minutes, with the total residence time in the primary reactors being at least about six minutes. If less than three primary reactors are used, or if the residence time is below about thirty seconds or above about three minutes in each primary reactor, or if the total residence time in the primary reactors is below about six minutes, then the resulting vanadium oxide product does not meet commercial specifications and is unsatisfactory. The residence time of the liquor in the secondary reactors is not critical, nor is the number of secondary reactors. It is desirable from the standpoint of efficient recovery of the vanadium content that the slurry of precipitated product and liquor, which still contains considerable amounts of vanadium in solution, be passed to a reactor and a residence time provided therein such as is sufficient to allow the desired degree of depletion of vanadium from the liquor.

The feed to the primary and secondary reactors has been referred to in the specification and claims as being continuous. However, the terms "continuous" or "continuously" are understood to include feeding the liquor intermittently provided the feed is essentially continuous, i.e., with only short periods of time elapsing between additions of feed liquor. For example, the feed to a primary reactor may be interrupted periodically for 5 seconds or so and still the liquor would be considered as being continuously passed through the primary reactor for the purposes of the present invention.

The foregoing detailed description and the following specific examples are for the purpose of illustration only and are not intended as being limiting to the spirit or scope of the appended claims.

EXAMPLE I

This example illustrates a suitable process for the batch precipitation of a specification grade vanadium oxide product.

A "reduced" acidic vanadium liquor assaying 30 g./l. $V_2O_5$, 100 g./l. $SO_4^{--}$, and 0.20 g./l. $P_2O_5$ was neutralized with ammonia from a pH of 0.2 to a pH of 1.7 and charged to a batch type reactor. The liquor charged to the reactor was heated to boiling and then oxidized by the rapid addition of a slight excess of $NaClO_3$ over the amount required to oxidize the vanadium content to the plus 5 oxidation state. The amount of $NaClO_3$ added was a quantity sufficient to maintain the E.M.F. in the reactor in the close proximity of −700 mv. (platinum vs. saturated calomel) since at an E.M.F. of −700 mv. (platinum vs. saturated calomel) substantially all of the vanadium content of the liquor is in the plus 5 oxidation state. Within about one minute after addition of the $NaClO_3$ to the liquor, a massive dark-brown precipitate formed. The mixture of precipitate and liquor was digested at the boiling point of the liquor for one hour and then filtered to yield a grainy, easily filtered and washed vanadium oxide product. This product, which was believed to be hydrated $V_2O_5$, was dried at 115° C. The pH of the barren liquor was 1.1 as measured at 30° C. An analysis of the dried product indicated the following composition:

|  | Percent |
|---|---|
| $V_2O_5$ | 91–93 |
| $P_2O_5$ | 0.03–0.05 |
| $SO_4^{--}$ | Nil—trace |

Inasmuch as the specifications for a commercially acceptable vanadium oxide product are a $V_2O_5$ content of at least 86%, a $P_2O_5$ content of not more than 0.115%, and an $SO_4^{--}$ content of not more than 0.45%, it will be apparent that the above described batch process will produce a vanadium oxide product meeting specifications and commercially acceptable in all respects.

EXAMPLE II

A vanadium containing liquor identical with that of Example I was neutralized with ammonia to a pH of 1.7 and then continuously fed to the first of a series of two reactors. The feed liquor was oxidized in the first reactor by the continuous addition of a slight excess of $NaClO_3$, the amount of $NaClO_3$ added to the first reactor being as described in Example I and thus sufficient to maintain substantially all the vanadium content of the liquor in the plus 5 oxidation state. The feed rate to the first reactor was adjusted to provide a thirty-minute residence time in the first reactor. The contents of the first reactor were vigorously agitated and maintained at a temperature approximating the boiling point of the liquor.

The contents of the first reactor containing liquor and some precipitated product were allowed to continuously overflow into the second of the series of two reactors, the second reactor having substantially the same capacity as the first reactor. Inasmuch as the capacity of the second reactor was substantially equal to that of the first reactor, and since the overflow from the first reactor to the second reactor was substantially the same as the feed rate to the first reactor, it will be apparent that the residence time of the liquor in the second reactor was also about thirty minutes. The contents of the second reactor were likewise vigorously agitated and maintained at a temperature approximating the boiling point of the liquor. It was not necessary to add additional quantities of $NaClO_3$ to the second reactor in order to maintain the vanadium content of the liquor in the plus 5 oxidation state in this particular instance.

The contents of the second reactor were allowed to overflow from the second reactor. The overflow, which was a slurry containing precipitated product and barren liquor, was filtered to remove the precipitated product. The pH of the barren liquor was 0.8 as measured at 30° C. The precipitate was then thoroughly washed and dried at 115° C. An analysis of the dried product thus prepared indicated the following composition:

|  | Percent |
|---|---|
| $V_2O_5$ | 90.0 |
| $P_2O_5$ | 0.24 |
| $SO_4^{--}$ | 0.54 |

It will be noted that the above prepared product is not a specification grade vanadium oxide product and therefore would not be commercially acceptable.

EXAMPLE III

The vanadium content of a liquor identical with that of Examples I and II in all respects with the exception of the $P_2O_5$ content, the $P_2O_5$ content of the liquor used in this example being 0.10 g./l., was precipitated and filtered following the same procedure used in Example II. The precipitate thus obtained was then dried at 115° C. An analysis of the dried product thus prepared indicated the following composition:

|  | Percent |
|---|---|
| $V_2O_5$ | 91.7 |
| $P_2O_5$ | 0.13 |
| $SO_4^{--}$ | 0.675 |

It will be noted that the above prepared vanadium oxide product also was not of specification grade even though the $P_2O_5$ content of the feed liquor was only one-half that of the feed liquors of Examples I and II.

The above Examples II and III illustrate attempts to continuously precipitate a specification grade vanadium oxide product from liquors identical with that of Example I, with the exception of the liquor of Example III having an even more favorable $P_2O_5$ content. It may be observed that it is possible to precipitate a specification grade vanadium oxide product following the batch procedure of Example I, but for some reason it is not possible to precipitate a specification grade vanadium oxide product by means of the continuous procedures of Examples II and III. This is true even though the feed liquor of Example II is identical with that of Example I; while the feed liquor of Example III is identical with that of Example I with the exception of $P_2O_5$ content, the $P_2O_5$ content of the Example III liquor being 0.10 g./l., or one-half the $P_2O_5$ content of the liquor of Example I. The pH of the feed liquors, oxidation state of vanadium, etc., are identical in all the above examples.

The following Examples IV and V illustrate the continuous precipitation of a specification grade vanadium oxide product in accordance with the present invention. The apparatus used in these examples was arranged in a manner substantially the same as that of the drawing. Accordingly, the drawing may be referred to in Examples IV and V for the purpose of clarity.

EXAMPLE IV

A vanadium containing liquor identical with that of Examples I and II was neutralized with ammonia to a pH of 1.7 and then continuously fed by means of conduit 20 to the first primary reactor 10 of the series of three primary reactors 10, 11 and 12. The three primary reactors 10, 11 and 12 were of substantially identical construction and all had substantially the same capacity. Thus, it will be apparent that the overflow from each of the primary reactors 10, 11 and 12 via conduits 17, 18 and 19, respectively, is controlled by and will be substantially the same as the feed rate to the first primary reactor 10. It follows that the residence time in each of the primary reactors 10, 11 and 12 is substantially the same period of time, and is controlled by the feed rate to the first pimary reactor 10.

The feed liquor to the first primary reactor 10 entering via conduit 20 was almost immediately oxidized in primary reactor 10 by the continuous addition via conduit 21 of a slight excess of $NaClO_3$. The amount of $NaClO_3$ added to the first primary reactor 10 was as described in Examples I, II and III, i.e., an amount sufficient to oxidize and maintain substantially all the vanadium content of the feed liquor in the plus 5 oxidation state. The contents of the primary reactors 10, 11 and 12 were vigorously agitated by agitation means 14, 15 and 16, respectively, and the temperature maintained at a temperature approximating the boiling point of the liquor by means of steam sparges.

The contents of the first primary reactor 10 containing liquor and some precipitated product were allowed to overflow into the second primary reactor 11 via conduit 17; and likewise, the contents of the second primary reactor 11 containing liquor and an additional amount of precipitated product over that precipitated in the first primary reactor 10, were allowed to overflow into the third primary reactor 12 via conduit 18; and similarly, the contents of the third primary reactor 12 containing liquor and an additional amount of precipitated product over that precipitated in the primary reactors 10 and 11 were allowed to overflow via conduit 19 into the first secondary reactor 26. The feed rate to the first primary reactor 10 via conduit 20 was so adjusted as to provide approximately a two-minute residence time in each of the primary reactors 10, 11 and 12. Thus, the total residence time in the series of primary reactors 10, 11 and 12 was six minutes, with a residence time in each individual reactor of two minutes.

The secondary reactors 26 and 27 were of substantially identical construction and capacity, the capacity being approximately 15 times that of the primary reactors 10, 11 and 12 to thereby provide a residence time of approximately 30 minutes in each of the secondary reactors 26 and 27, or a total residence time of approximately one hour. The contents of the secondary reactors 26 and 27 were vigorously agitated by agitation means 30 and 31, respectively, and maintained at a temperature approximating the boiling point of the liquor by means of steam sparges.

As mentioned above, the feed to secondary reactor 26 is the overflow via conduit 19 from the third primary reactor 12. The contents of the first secondary reactor 26 containing liquor and considerable quantities of precipitated product were allowed to overflow via conduit 32 into the secondary reactor 27 and, in turn, the contents of the second secondary reactor 27 were allowed to overflow via conduit 33. The overflow, which was a slurry containing barren liquor and the precipitated product, was then passed to a filter where the precipitated product was recovered.

It was not necessary in this particular instance to add additional quantities of $NaClO_3$ to either the primary reactors 11 and 12 or the secondary reactors 26 and 27 in order to maintain the vanadium content of the liquor in the plus 5 oxidation state. However, additional amounts of $NaClO_3$ may be added to one or more of the above mentioned primary or secondary reactors for this purpose when necessary. Similarly, while it was not necessary in this particular instance, the pH of the liquor within the primary or secondary reactors may be adjusted by adding a suitable mineral acid or base to one or more of the primary or secondary reactors. The pH of the barren liquor was 0.7 as measured at 27° C.

The filtered vanadium oxide product as above prepared was washed and then dried at 115° C. An analysis of the dried product indicated the following composition:

| | Percent |
|---|---|
| $V_2O_5$ | 93.8 |
| $P_2O_5$ | 0.09 |
| $SO_4^{--}$ | Trace |

EXAMPLE V

The vanadium content of three portions of a liquor identical with that of Examples I and II in all respects with the exception of the $P_2O_5$ content, the $P_2O_5$ content of the three portions of liquor used in this example being 0.10 g./l., was precipitated and filtered following the same procedure used in Example IV. The three portions of precipitate prepared in the foregoing three runs were washed and dried at 115° C. An analysis of each of the three portions of dried vanadium oxide product thus obtained indicated the following compositions:

Run No. 1

| | Percent |
|---|---|
| $V_2O_5$ | 93.2 |
| $P_2O_5$ | 0.03 |
| $SO_4^{--}$ | 0.22 |

Run No. 2

| | |
|---|---|
| $V_2O_5$ | 93.7 |
| $P_2O_5$ | 0.03 |
| $SO_4^{--}$ | 0.06 |

Run No. 3

| | |
|---|---|
| $V_2O_5$ | 94.0 |
| $P_2O_5$ | 0.06 |
| $SO_4^{--}$ | 0.09 |

It may be observed from the data of Examples IV and V that it is possible to continuously precipitate a vanadium oxide product in accordance with the present invention which will meet commercial specifications in all respects. However, it has been found that this may be accomplished only if at least three primary reactors are provided and if the residence time in each of the three primary reactors is between about 30 seconds and three minutes, with a total residence time in the three reactors being at least about six minutes. The residence time in either of the primary reactors must not exceed about three minutes or it is not possible to continuously precipitate a specification grade vanadium oxide product, as illustrated by the following Examples VI and VII. Also, if at least three primary reactors are not used, it is not possible to continuously precipitate a specification grade vanadium oxide product, as illustrated by Examples II and III. The residence time in each of the secondary reactors, or the total residence time in the secondary reactors is not critical but should be such as to allow substantially complete depletion of the vanadium content of the feed liquor.

EXAMPLE VI

The following example illustrates the criticality of the residence time in the primary reactors.

The vanadium content of a liquor identical with that of Example IV is precipitated and filtered following the same procedure used in Example IV, with the exception of the residence time in each of the primary reactors 10, 11 and 12 being ten minutes in each primary reactor, i.e., a total residence time in the primary reactors 10, 11 and 12 of thirty minutes. The capacity of the secondary reactors 26 and 27 is such as to provide a residence time of thirty minutes in each secondary reactor 26 and 27, or a total residence time of one hour, as in Example IV. The precipitate is then washed and dried at 115° C.

Analysis of a dried precipitate as above prepared indicates a $P_2O_5$ content which is above the maximum allowable $P_2O_5$ content for a specification grade vanadium oxide product, i.e., above 0.115%. Thus, longer residence times in the three primary reactors will not produce a vanadium oxide product which will meet commercial specifications.

EXAMPLE VII

This example further illustrates the criticality of the residence time in the primary reactors when carrying out the continuous precipitation process of the present invention.

The vanadium content of a liquor identical with that of Example V in all respects is precipitated and filtered following the same procedure used in Example VI. The precipitate thus obtained is then washed and dried at 115° C.

Analysis of dried products as above prepared indicate $P_2O_5$ contents which are above the maximum allowable $P_2O_5$ content for a commercially acceptable vanadium oxide product in every instance. Thus, the residence time in each of the primary reactors employed in practicing the process of the present invention is critical even when the $P_2O_5$ content of the feed liquor is only 0.10 g./l.

EXAMPLE VIII

An alkaline oxidized vanadium liquor was prepared by leaching a crude iron vanadate with an excess of hot aqueous 20% sodium hydroxide and filtering the slurry to separate the hydrated ferric oxide. The pregnant solution thus prepared contained 42 g. $V_2O_5$ per liter and 0.85 g. $P_2O_5$ per liter. The pH was in excess of 10.

For facile continuous precipitation by the process herein disclosed the alkaline vanadate solution is conditioned in a series of two conditioning surge tanks (not shown) ahead of the primary reactor 10. In the first of these conditioning tanks, the pH of the liquor is adjusted to 4–4.5 by the addition of concentrated sulfuric acid. The liquor proceeds to the second conditioning tank where it is heated to 75–80° C. Under these conditions, no precipitation of vanadium occurs.

The conditioned liquor is then fed to a series of primary reactors identical with those of Example IV except that there are six primary reactors in series and the residence time within each reactor is 1½ minutes. The reactors are equipped with steam sparges and conduits for introduction of reagents such as 50% sulfuric acid, caustic soda, and sodium chlorate. By metered addition of the 50% sulfuric acid, the contents of the primary reactors are brought to a pH of 0.6–1.1 and the temperature raised to 90–92° C. by means of the steam sparges. Traces of sodium chlorate as a 25% solution are added at intervals when it is observed that the solution takes on a greenish tint, indicating unoxidized vanadium to be present. Thus, the E.M.F. is maintained in the region of −700 mv.

In consequence of the sudden drop in pH encountered by the conditioned liquor as it feeds into the series of primary reactors, rapid precipitation of a hydrated vanadium oxide slightly contaminated with sodium ensues. The slurry passes through the series of six primary reactors into a single secondary reactor wherein the $V_2O_5$ content of the liquor is depleted during an additional hour's residence at elevated temperature. The slurry is diluted with water to cool it, and passes to a stainless steel drum filter where the precipitated vanadium product is filtered, washed, repulped, refiltered and dried at 120° C. Analysis of the dried product indicates it to meet all the specifications for a commercial vanadium oxide.

What is claimed is:

1. A continuous process for the precipitation of a vanadium oxide product comprising passing a liquor containing vanadium values in solution through a series of at least three primary reactors, the liquor having a temperature between about 80° C. atnd the boiling point and a pH of about 0.5–1.7, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, and precipitating vanadium oxide product from the liquor while passing through the primary reactors.

2. A continuous process for the precipitation of a vanadium oxide product comprising passing a liquor containing vanadium values in solution through a series of at least three primary reactors, the liquor having a temperature between about 80° C. and the boiling point and a pH of about 0.5–1.7, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

3. A continuous process for the precipitation of a vanadium oxide product comprising passing a liquor containing vanadium values in solution through a series of at least three primary reactors, the liquor having a temperature between about 80° C. and the boiling point and a pH of about 0.5–1.0, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, and precipitating vanadium oxide product from the liquor while passing through the primary reactors.

4. A continuous process for the precipitation of a vanadium oxide product comprising passing a liquor containing vanadium values in solution through a series of at least three primary reactors, the liquor having a temperature between about 80° C. and the boiling point and a pH of about 0.5–1.0, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

5. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.7 and a $V_2O_5$ to $P_2O_5$ ratio of at least 30:1, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, and precipitating vanadium oxide product from the liquor while passing through the primary reactors.

6. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.7 and a $V_2O_5$ to $P_2O_5$ ratio of at least 30:1, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

7. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.0 and a $V_2O_5$ to $P_2O_5$ ratio of at least 30:1, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, and precipitating vanadium oxide product from the liquor while passing through the primary reactors.

8. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.0 and a $V_2O_5$ to $P_2O_5$ ratio of at least 30:1, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

9. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.7, a $V_2O_5$ to $P_2O_5$ ratio of at least 30:1 and at least 10 grams per liter of $V_2O_5$, the vanadium content of the liquor being substantially all in the plus 5 oxidation state while within the primary reactors, the residence time of the liquor within each of the primary reactors being between thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

10. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.0, a $V_2O_5$ to $P_2O_5$ ratio of at least 30:1 and at least 10 grams per liter of $V_2O_5$, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

11. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.7, a $V_2O_5$ to $P_2O_5$ ratio of at least 100:1 and at least 10 grams per liter of $V_2O_5$, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

12. A continuous process for the precipitation of a vanadium oxide product comprising passing a liquor containing vanadium and phosphorus values in solution through a series of at least three primary reactors, the liquor having a temperature between about 80° C. and the boiling point, a pH of about 0.5–1.0, a $V_2O_5$ to $P_2O_5$ ratio of about 30:1–100:1 and at least 10 grams per liter of $V_2O_5$, the vanadium content of the liquor being substantially all in the plus 5 oxidation state while within the primary reactors, the residence time of the liquor within each of the primary reactors being between about thirty seconds and three minutes with the total residence time of the liquor within the primary reactors being at least six minutes, precipitating vanadium oxide product from the liquor while passing through the primary reactors, and thereafter passing the liquor from the last primary reactor through at least one secondary reactor.

References Cited in the file of this patent
UNITED STATES PATENTS

| | | |
|---|---|---|
| 1,069,981 | Schaaf et al. | Aug. 12, 1913 |
| 1,084,600 | Best | Jan. 20, 1914 |
| 2,109,917 | Dunn | Mar. 1, 1938 |
| 2,111,600 | Miles et al. | Mar. 22, 1938 |
| 2,136,372 | Burnett | Nov. 15, 1938 |
| 2,151,261 | Bartlett | Mar. 21, 1939 |
| 2,227,833 | Hixson et al. | Jan. 7, 1941 |
| 2,357,988 | Van Wirt | Sept. 12, 1944 |
| 2,551,733 | Dunn et al. | May 8, 1951 |
| 2,733,980 | Lundquist | Feb. 7, 1956 |
| 2,756,122 | McLean | July 24, 1956 |
| 2,770,522 | Bailes et al. | Nov. 13, 1956 |
| 2,784,075 | Bauerle et al. | Mar. 5, 1957 |
| 2,859,107 | Brundin et al. | Nov. 4, 1958 |
| 2,864,692 | Mancke et al. | Dec. 16, 1958 |